United States Patent [19]
Utchell

[11] 3,896,854
[45] July 29, 1975

[54] MEANS FOR AUTOMATICALLY TIMING INTERMITTENT CYCLES OF LIQUID FLOW

[76] Inventor: James A. Utchell, 7749 Golondrina, San Bernardino, Calif. 92410

[22] Filed: Aug. 7, 1974

[21] Appl. No.: 495,324

[52] U.S. Cl. ........ 137/624.14; 137/624.27; 239/68; 239/70; 137/423
[51] Int. Cl............................................ A01g 27/00
[58] Field of Search..... 137/624.14, 101.27, 624.27, 137/423; 239/65, 68, 70

[56] References Cited
UNITED STATES PATENTS

| | | | |
|---|---|---|---|
| 2,202,549 | 5/1940 | Donaldson | 137/624.14 |
| 3,078,866 | 2/1963 | Crow | 137/624.14 X |

*Primary Examiner*—Alan Cohan
*Attorney, Agent, or Firm*—John H. Crowe

[57] ABSTRACT

Apparatus for automatically timing the watering cycles of a sprinkling system. The apparatus includes a water tank with an inlet opening and a drain outlet and a float mechanism that opens and closes a master valve for the system in accordance with a fixed timing sequence. The float mechanism includes a center float flanked by first and second side floats, each slidably mounted to travel between upper and lower limits on a separate guide rod. Additionally, the float mechanism includes a first pivoted lever and a second pivoted lever. Slidably mounted on the top portion of the guide rod for the center float is a finger that extends upwardly into contact with the outer end of a control lever for the master valve. Water flows into the tank from a point downstream of the master valve and causes the side floats to rise. Eventually the first side float moves the first pivoted lever in a way which causes the center float to shut off the master valve by exerting force on the control lever through the finger. The tank then drains. When the tank is drained, the second side float moves the second pivoted lever in a way to effectuate opening of the master valve, and the tank starts filling again.

10 Claims, 6 Drawing Figures

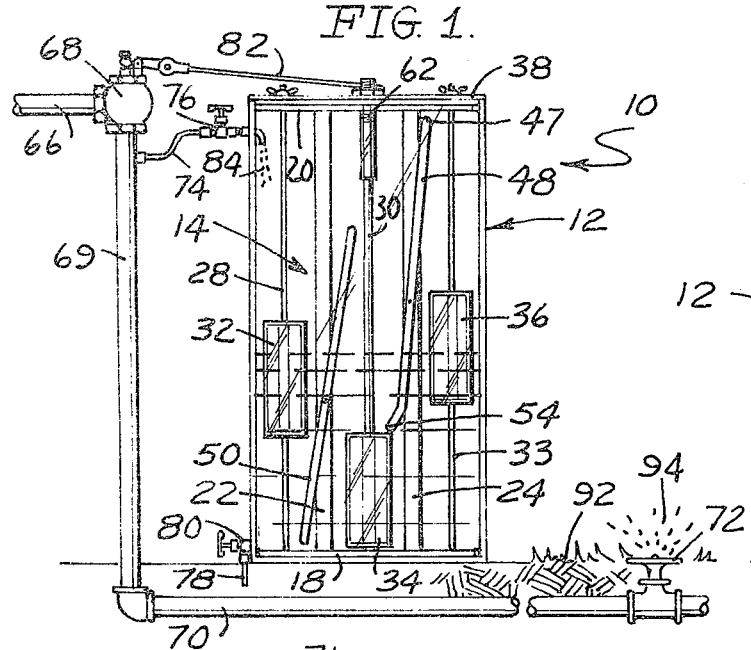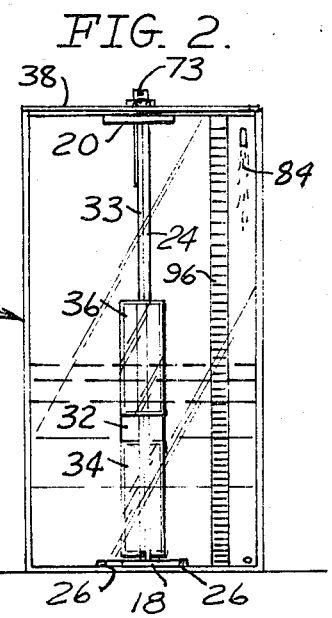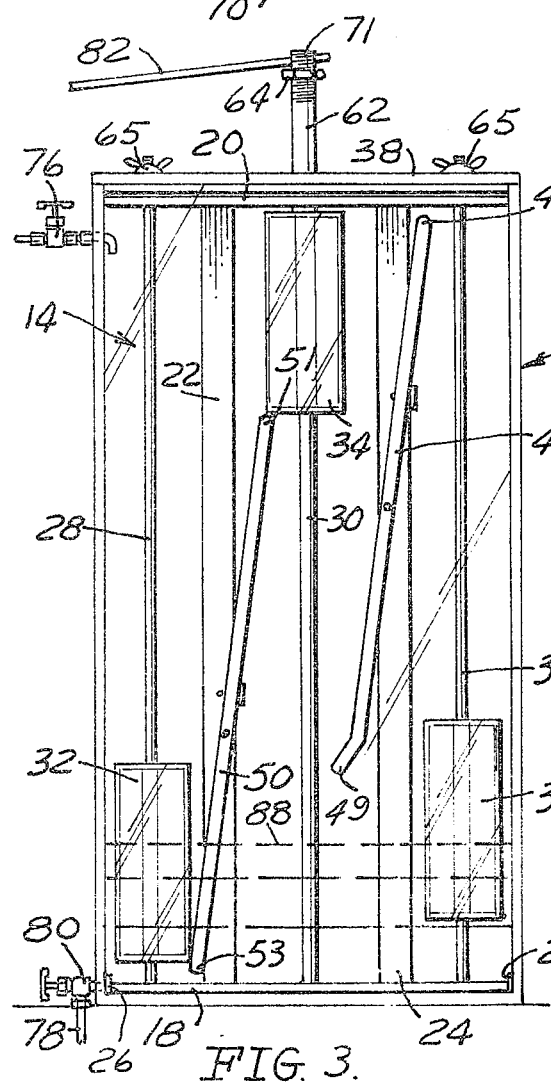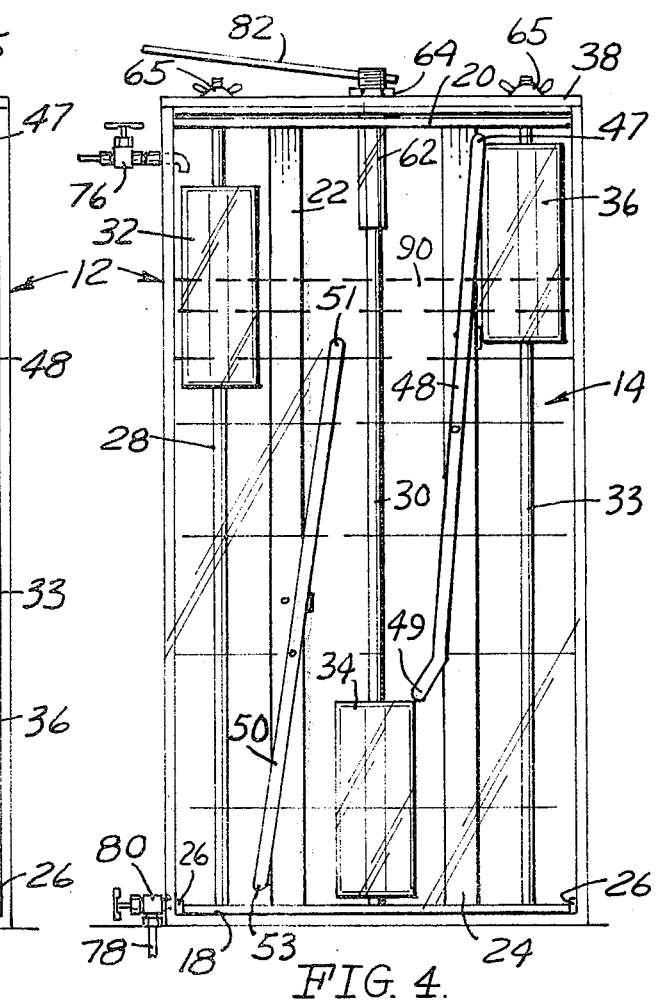

PATENTED JUL 29 1975　　　　　　　　　　　　3,896,854

SHEET 2

MEANS FOR AUTOMATICALLY TIMING INTERMITTENT CYCLES OF LIQUID FLOW

BACKGROUND OF THE INVENTION

This invention relates generally to liquid flow control means, and more particularly to such means for automatically timing the cycles of irrigation water flow solely under the influence of water action and without requiring any input of electrical energy.

While various means for automatically timing the watering cycles of lawn sprinkling, and other, irrigation systems, have been heretofore proposed, practically all of which I am aware have been electrically powered. While this, of itself, might not have been considered much of a disadvantage in the past when the available supply of electrical energy seemed adequate for all anticipated demands, such is no longer the case since it has become painfully apparent in recent years that customer demands for electrical energy have at times exceeded industry's ability to meet them. In fact, the shortage of electrical energy in this country has on various occasions within the last few years become so acute in certain areas, such as, for example, the New York metropolitan area, that "brownouts" have proven a necessity at peak load periods. For reasons familiar to anyone who reads newspaper regularly, or watches the daily news on television, this shortage of energy, not only in this country but throughout the world, has presently reached such proportions that it is commonly referred to as an "energy crisis." By all accounts, this "crisis" is worsening and there is no encouragement from any quarter that the energy problems facing the world will be satisfactorily solved at any time in the near future.

In view of the foregoing, the use of valuable electrical energy for the powering of irrigation timing devices should, I feel, be a matter of grave concern, particularly when the large and increasing number of private lawns and gardens, golf courses, playing fields, nurseries, etc., employing such devices is taken into consideration. Under the circumstances, any economically feasible irrigation timing means capable of functioning successfully without consuming electrical power would, I believe, be of great benefit to the general public.

In addition to their consuming need for scarce electrical energy, the prior art irrigation timers mentioned above include electrical components and circuitry which make them somewhat difficult and expensive to install and repair. Furthermore, such timers create an inherent risk of shock because of their electrical character.

SUMMARY OF THE INVENTION

I have now provided, in the novel timing means of this invention, an apparatus of relatively simple construction that can be installed in a sprinkling or other irrigation system with little difficulty, can be repaired easily and relatively inexpensively when necessary, and operates solely under the influence of liquid action, without requiring any electrical energy or circuitry, or components to malfunction or get out of adjustment. Thus, my novel timing means constitutes an economically attractive alternative to the prior art irrigation timers, and one which operates solely under the influence of the water fed to the irrigation system, and without any consumption of electricity.

Briefly, the novel irrigation timing means of this invention comprises, in its preferred form, a holding tank for water with an inlet opening near the top and a drain outlet near the bottom and a float mechanism designed for mounting within the tank for ON/OFF control of an associated master valve for the irrigation system.

The float mechanism comprises three floats, a center float and two side floats, slidably mounted on guide rods positioned within the tank. Between the center float and each of the side floats is a pivoted lever. A first of these levers is positioned so that its lower end normally holds the center float in the bottom of the tank, and its upper end is within the path of travel of a first of the side floats so that upward movement of the latter causes it to urge the lever out of contact with the center float when it (the side float) arrives at substantially the upper limit of said travel. The second pivoted lever is normally positioned so that its upper end is disposed underneath the center float when the latter is in its uppermost position within the tank, the lower end of that lever being positioned in the path of downward travel of the second side float so that this second side float urges the lever out from under the center float when it (the second side float) arrives substantially at its lowermost terminus.

In its preferred form, the timing apparatus of this invention is used in conjunction with a lawn sprinkling system serviced by a master valve fitted with an elongate control lever or handle normally disposed in such position as to hold the valve open. The outer end of this handle extends over the top of the aforesaid tank when the timing means is properly installed for use. An input water line, fitted with a manually controllable valve, runs from a point in the sprinkler system feed line just downstream of the master valve to the inlet opening of the aforesaid tank. A drain line is connected to the drain outlet of the tank through a second manually controlled valve. Slidably mounted on the top portion of the guide rod for the center float is an upstanding finger, which extends upwardly out of the tank and into contact with the outer end of the control handle for the master valve.

When the water in the tank of the operating timing apparatus reaches a critically low lever, the master valve opens through lowering of the outer end of its control handle by downward movement of the slidable finger on the guide rod for the center float whose upper end (that is, the upper end of the finger is in actuating contact with said outer end. The manually controlled valve in the inlet water line to the tank has been set so that the flow rate therethrough is adequate to fill the tank to a predetermined level within a fixed time period corresponding to the desired watering cycle of the sprinkling system. At the same time that water is flowing into the tank, it is draining therefrom through the manually controlled valve at the drain outlet which has been set to drain the tank within a second fixed period corresponding to the desired time lapse between watering cycles in the irrigation system. Although, as indicated, the tank is draining at all times, even while being filled, it is a simple matter to adjust the flow rates into and out of the tank so as to adjust alternating watering and non-watering (ON and OFF) cycles of the system to varying time periods over a suitable range for any of a variety of irrigating situations.

When the master valve is open, the tank is, of course filling, during which period the center float is held in its lowermost position by the lower end of the first pivoted lever. At the same time, the first and second side floats are riding upwardly, on their guide rods, as the water level rises in the tank. When the first side float approaches the uppermost limit of its travel, it makes contact with the upper end of the first pivoted lever, thereby causing the lower end of that lever to move out of its position of obstruction of the center float. The center float then bobs quickly upwardly until it contacts the aforesaid finger, then urges that finger upwardly, which in turn urges the control lever handle of the master valve to shut off said valve. When the center float reaches its uppermost position, the second pivoted lever swings so that its upper end holds the center float against descent. The center floas is thus confined to its uppermost position, where it holds the master valve closed, and water starts to drain from the tank. During the water draining cycle, as previously noted, the sprinkling system is receiving no water, and remains OFF until the tank has drained to the critically low level indicated above. As the tank drains, the first and second side floats descend until the water level reaches its low point therein, whereat the second side float urges the second pivoted lever out of the downward path of travel of the center float and the center float drops to the water in the bottom of the tank (which serves to cushion its fall), releasing the finger. This allows the valve control handle to return to its normal position, and thereby open the master valve. Water now begins to flow back into the sprinkling system, and into the tank, and the tank filling (watering) cycle is repeated. When the tank is filled to the above-indicated level, the float mechanism again functions to shut off the master valve, and the draining (OFF) cycle is repeated. These alternating ON and OFF cycles of sprinkler operation continue as long as the timing apparatus is in working order and properly supplied with water. As will be evident, the only source of power for the apparatus is the feed water to the sprinkling system — no electrical energy being required in the process.

It is thus a principal object of this invention to provide a relatively inexpensive and trouble-free means for automatically timing the watering cycles of an irrigation system.

It is another object of the invention to provide such means operative solely under the influence of water fed to the irrigation system and without the need of any electrical energy.

It is yet another object of the invention to provide such timing means absent any risk of electrical shock in its highly conductive (damp ground) environment of use.

Other objects, features and advantages of the invention will become apparent in the light of subsequent disclosures herein.

BRIEF DESCRIPTION OF THE DRAWINGS

FIG. 1 is a front elevation of a preferred form of irrigation timing apparatus in accordance with this invention installed for use in a lawn sprinkling system, the piping feeding the system being shown fragmentarily, and one of the sprinkler heads being shown delivering water to the lawn.

FIG. 2 is a side elevation of the apparatus, as seen from the right of its FIG. 1 position.

FIG. 3 is an enlarged front elevation of the timing apparatus, showing the position of three floats comprising principal components of a float mechanism forming an important part of the apparatus, the floats being depicted in positions corresponding to a critical point in the operation of the device.

FIG. 4 is a front elevation similar to FIG. 3, but showing the float positions at a second critical point in the operation of the device.

DESCRIPTION OF THE PREFERRED EMBODIMENT

Figure 5:
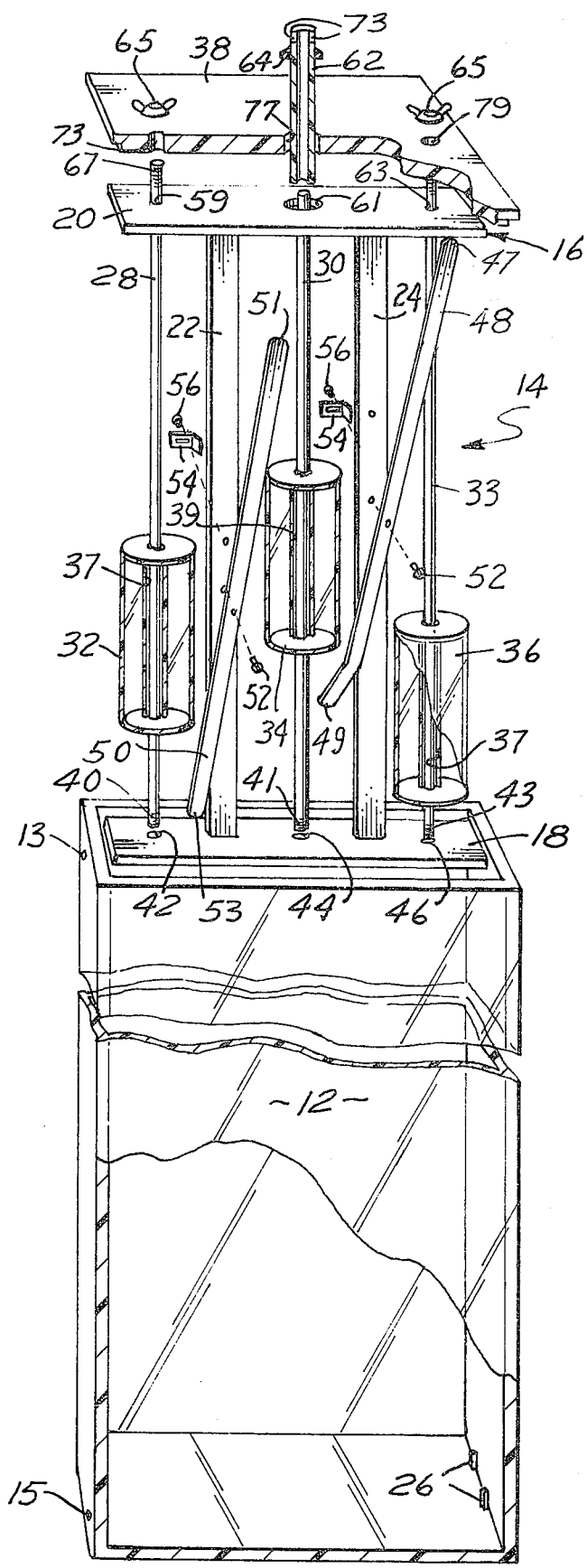
FIG. 5 is an exploded perspective view, partly broken away and partly in section, of the timing apparatus with the floats arbitrarily positioned for good illustrative effect.
Figure 6:
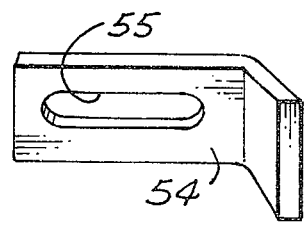
FIG. 6 is an enlarged perspective view of one of a pair of adjustable stop brackets for holding a pair of pivoted lever components of said float mechanism in their normal positions of use in the apparatus.

Considering now the drawings in greater detail, with emphasis first on FIG. 1, there is shown generally at 10 a sprinkler timing apparatus of preferred design in accordance with this invention connected to a sprinkler system receiving water under pressure from a conduit 66 through a master valve 68 and including a number of separate sprinkler heads, one of which is shown at 72, judiciously spaced in a lawn 92 to permit adequate coverage of the lawn when the sprinkler system is turned on. The principal parts of the timing apparatus include a water tank 12 and a float mechanism 14 substantially enclosed within the tank, as shown. Water tank 12 is of square cross section, and formed from a transparent plastic material, such as lucite, but it is to be understood that these limitations are not critical, and a tank of other than square cross section and/or formed of other than lucite (or even plastic) can be substituted thereof, if desired. It is preferable, however, that the tank, and other parts of the timing apparatus coming into contact with water, be formed of material, or materials, resistant to corrosion, or other deterioration, under their conditions and environment of use. Tank 12 has an inlet opening 13 near the top of one side, and a drain out 15 near the bottom of that side (see FIG. 5), for purposes hereinafter appearing.

Float mechanism 14 includes three cylindrical floats 32, 34 and 36, slidably mounted on three guide rods 28, 30 and 33, respectively, the floats and guide rods being formed of a suitable plastic material, such as, for example, lucite. It is not critically necessary that these parts be formed of lucite, and there are no doubt other materials (metals, plastics, etc.), which would be economically superior thereto in commercial versions of the apparatus. As FIG. 5 makes clear, the floats 32, 34 and 36 are provided with tubular axial guideways 37 (floats 32 and 36) and 39 (float 34), sized to permit loosely sliding interfit between the floats and their respective guide rods.

As FIGS. 1-5 show, float guide rods 28, 30 and 33 are vertically positioned in alignment, and spaced so that the center rod is equidistant from the other two. It will be noted from the drawings that the floats and their corresponding guide rods are numbered in ascending order from left to right, the center float, for example, being number 34 and its guide rod number 30. The floats are given different reference numerals primarily for ease of reference herein since, as will be apparent, they perform different functions in the timing apparatus. The float guide rods are held in position by means of a frame or rack 16 (see FIG. 5) having a flat, relatively narrow, horizontal foot 18 and a flat, relatively narrow horizontal top 20, and a pair of strap-like, upright members 22 and 24 integrally joined to the foot and top members in spaced-apart relationship between center float 34 and each of the side floats 32 and 36. The upright members 22 and 24 are positioned in coplanar alignment for support of a pair of pivoted levers 48 and 50 whose purposes and functions will be described below. The three guide rods are threaded at the bottom, as illustrated at 40, 41 and 43 in FIG. 4, for threaded engagement with three tapped holes 42, 44 and 46 in foot 18 of the frame 16, also illustrated in FIG. 5. The top member 20 of frame 16 is provided with three openings 59, 61 and 63, through which the respective guide rods 28, 30 and 33 extend, the center opening 61 being larger than the other two (which are of the same size) for a reason soon to be explained. The frame 16 is of a height only slighly less than the depth of tank 12, and the foot and top members 18 and 20 are long enough to extend substantially all of the way across the width of the tank to permit the latter to receive the frame in the manner illustrated in the drawings.

Affixed to the bottom and each of the two side walls of tank 12 by a suitable adhesive, or the like, so as to form internal means to prevent swivelling or sidewise movement of the frame, is a pair of stops 26, one complete pair of the stops being shown in FIGS. 2 and 5. The two pairs of stops 26 are disposed in oppositely facing relationship to define a confining space for the foot of frame 16 across substantially the mid-portion of the tank between its front and rear walls. The lengths of the guide rods 28 and 33 for side floats 32 and 36 are equal, and sufficient to extend upwardly out of tank 12 through a flat top 38 for said tank, openings being provided in the top at 73 and 79, respectively, for that purpose (see FIG. 5). The corresponding openings in the top member 20 of rack 16 and tank top 38 for said guide rods are sized to permit relatively close, but non-binding, passage of the guide rods therethrough. The length of the guide rod is such that a portion of the upper end of each extends through its receptive opening in the tank top to receive a wing nut 65, the upper ends of the guide rods being, of course, threaded to receive the nuts, as illustrated at 67 on guide rod 28 in FIG. 5. As will now be apparent, the frame 16 is mounted for use within the tank 12 with its foot member 18 in the spaced defined, at the corners, by the four stop members 26; the tank top 38 positioned flat on the top of tank 12; the guide rods 28 and 33 threaded through their respective openings in the tank top and the wing nuts 65 tightened on the threaded upper ends of said guide rods.

Pivotally secured to the upright member 24 of the float mechanism 14, between the center float 34 and side float 36, is a first lever 48(this being one of the two pivoted levers previously referred to). The pivoted connection between the lever and upright member is formed with a screw 52 (see FIG. 5), an accessory spacer washer, nut, etc., hardware, not shown. The pivot point for the lever 48 is closer to its lower, than it upper end, so that the lever tends to swing from the vertical. Lever 48 is maintained in a normal position of rest in slight clockwise rotation from its vertical position by means of an angled stop bracket 54, fastened to upright member 24 with a screw 56 in the manner made clear in FIG. 5. The stop bracket is designed, and positioned, to stop rotation of the pivoted lever 48 at a point such that its lower end, shown at 49, overrides the top of the center float 34 to prevent upward movement of that float until the lever is swung out of the way of said float in a manner soon to be described. The lever 48, moreover, is designed so that when it rests against said stop bracket its upper end, shown at 47, extends into the path of upward movement of side float 36 as the latter nears its upper limit of travel in tank 12. The purpose of this is to insure automatic release of the center float by the lever 48 when side float 36 is brought to this upper limit of travel by rising water in tank 12 in a manner, and for a reason, hereinafter to be explained, this release being effectuated by the application of force from the rising float to the lever. Lever 48, incidentally, is angled as shown at its lower end merely as a matter of design expediency to insure its proper functioning in cooperation with those parts of float mechanism 14 with which it must come into contact in use. This is, therefore, not a critical feature of the lever, and any lever, straight or otherwise, operative for the same purpose as that of lever 48 could be employed within the scope of the invention if desired.

Pivotally mounted on the upright member 22 of frame 16, by means of a second screw 52 and accompanying hardware, not shown, is a second lever 50 (this being the other of the two previously mentioned pivoted levers). Lever 50 is somewhat similar to lever 48, except that is it mounted between the left-hand side float 32 and center float 34 to assume a normal position of rest in which its upper end, shown at 51, blocks the downward path of travel of the center float when the latter is positioned at substantially the upper limit of its travel in tank 12, all as illustrated in FIG. 3. The lever 50 is retained in this normal position by means of a second stop bracket 54 fastened to upright member 22 by means of a second screw 56 (see FIG. 5). When so positioned, the lower end of lever 50, shown at 53, extends into the path of downward travel of the float 32, and is movable by the descent of that float, as will be hereinafter described, far enough to urge the upper end of the lever from under the center float 34 and thereby permit the latter to drop at a desired time as will be hereinafter designated. The forces responsible for bringing about the above-mentioned movements of said floats will be discussed in detail in a description of the manner of operation of timing apparatus 10 following hereinafter. To allow for adjustability of the normal positions of rest of levers 48 and 50, each of the stop brackets 54 is provided with a slot 55, best shown in FIG. 7, whereby the bracket can be moved transversely with respect to its supporting upright member.

FIG. 1 shows the manner in which timing apparatus 10 is installed for use in the above-mentioned lawn sprinkling system connected to the input water conduit 66 through the master valve 68, which includes a feeder line 69 for feeding water to a network of underground pipes leading to a plurality of sprinkler heads, one such pipe being shown at 70 and one of the sprinkler heads being shown, as previously indicated, at 72. The master valve 68 is provided with a control lever 82 which extends outwardly to a point near the center of tank 12, and is supported, at its outer end, by a sleeve-like finger 62, slidably encompassing the upper end of guide rod 30 for the center float 34, the finger being notches at its upper end, as shown at 73 in FIGS. 2 and 5, to provide a seat for said control lever. Finger 62 is of clear plastic (for example, lucite) construction, and threaded as shown at 71, to receive a plastic nut 64, which serves as a stop collar to prevent downward escape of the finger into the interior of tank 12. The flat top member 20 of float mechanism frame 16 and tank top 38 are provided with aligned openings 61 and 77, respectively, which openings are properly sized to admit finger 62 in loosely sliding relationship, but are, of course, of small enough diameter to prevent the passage of collar nut 64.

A bleeder line 74 runs from the feeder line 69 of the sprinkler system to the inlet opening 13 in tank 12, through a manually adjustable valve 76. A second manually adjustable valve 80 connects the drain outlet 15 of the tank with a drain line 78, a portion of which can be seen in FIGS. 1, 3 and 4 of the drawings. This drain line can run to any suitable drain area, such as a flower bed or the like, for disposal and/or watering purposes.

Timing apparatus 10 is calibrated, prior to use, by setting the manually adjustable valve 80 so as to limit drainage of the tank to the desired time interval sprinkling, or watering, cycles of the system. The period between sprinkling cycles (or OFF cycle) will vary with the type of grass or other ground cover in the lawn, season, temperature, soil type, etc. For example, the time period might be 1 week for one type of lawn cover in a particular geographical area in the summer, but could vary anywhere from a few hours to periods even longer than a week in other lawn cover and/or geographical situations. The apparatus is further calibrated by setting the opening in manual valve 76 to admit water to the tank at a rate such as to fill the tank, while the drain line valve remains open, within a time period corresponding to that of the desired sprinkling (or ON) cycle for the system. Here again, the time period could vary, depending upon the season, temperature, type of ground cover, etc. The desired sprinkling period might, for example, be 1 or 2 hours, although, as indicated, it could vary from this. The variance, however, will generally not be as extensive as that of the OFF cycle of the sprinkling system.

As previously indicated, the master valve 68 is normally open. When that valve is open, its control level 82 is positioned as shown in FIG. 1, with its outer end at the lower extreme of a permissible range of travel, the upper limit of this range being indicated in FIG. 3. When timing apparatus 10 is in operation, the three floats 32, 34, 36 are at the bottom of tank 12 at the beginning of the tank-filling (or ON) cycle of operations, and pivoted lever 48 is in its normal position of rotation from the vertical, with its lower end overriding the top of the center float in the manner illustrated in FIG. 1. Water enters the tank from feeder line 69 through the manually adjustable valve 76, as shown at 84, while at the same time, water is draining from the tank through drain line 78 at a slower rate than it is entering. As the water level rises in tank 12, the two side floats are carried upwardly in the manner illustrated in FIG. 1, which shows the position of those floats at a point intermediate the tank-filling cycle. At the same time, the center float 34 is prevented from upward movement by the overriding presence of the lower end of pivoted lever 48, again as illustrated in FIG. 1. All of this time, the sprinklers in the system are operating, as indicated at 94 in FIG. 1. Eventually, the rising water in the tank carries side float 36 into contact with pivoted lever 48 near the upper end of the latter, and that float thereafter urges the lever through counter-clockwise rotational movement, as seen from the front, so that the lower end 49 of the lever moves clear of the top center float 34. At this point, tank 12 is considered to be substantially "filled," although, as will be apparent, the water level therein is actually short of the top of the tank. This is pretty well illustrated by FIG. 4, which shows the pivoted lever 48 as it appears when the tank is substantially filled and at a time just prior to its movement by side float 36 clear of the center float 34, at which point the water level is shown at 90, to be quite a bit shy of the tank top.

When the side float 36 causes pivoted lever 48 to free center float 34 in the above-described manner, the timing apparatus has substantially completed its tank-filling (lawn watering) cycle, and the center float, by virtue of its buoyancy, bobs upwardly and into contact with the lower end of the finger 62 on guide rod 30 to urge said finger, and the outer end of the master valve control lever 82, upwardly. This urging of control lever 82 upwardly results in closure of the master valve, and commencement of the tank-draining cycle, during which the sprinkler system is turned off and not irrigating the lawn 92. When center float 34 bobs to the top of the water in tank 12, it is at a high enough elevation to clear the upper end of pivoted lever 50, which lever then assumes its normal position in which, as previously indicated, its upper end 51 swings underneath the center float to prevent downward movement of the latter. When master valve 68 is closed, as a result of the rapid upward movement of center float 34, water inflow to the sprinkling system, and tank 12, immediately ceases, and the water in the tank starts to drain out through drain line 78. Because of the rapid upward movement of the center float, there is quick and positive closure of the master valve, rather than gradual closure thereof as would be the case if a conventional float valve of the type employed in an ordinary water closet tank were used in lieu of float mechanism 14. This points up an important feature of my invention, namely, the ability of its float mechanism to effectuate quick and positive shut-down of the master valve which, in turn, assures precise, dependable timing of the irrigation cycles in the sprinkling system similar to that achievable with electrically powered timing means and without the inherent seepage disadvantages of conventional water closet-type float valve systems.

The tank draining cycle lasts until the water level within tank 12 has dropped to the point at which the left side float 32 contacts the lower portion of the pivoted lever 50 with sufficient force to urge that lever counterclockwise and out from under center float 34. FIG. 3 shows the water level at substantially this point at 88, and depicts float 32 as it appears just prior to moving pivoted lever 50 from beneath float 34. When lever 50 is thus urged from beneath center float 34, the center float immediately drops to the bottom of the tank, to release finger 62, which, in turn, drops to its lowermost position and permits the master valve control lever 82 to swing down into its normal, valve-open position, as illustrated FIG. 1. This effectuates the beginning of another tank-filling cycle, during which time the sprinklers 72 are again turned on. The above-described sequence of cycles continues to repeat itself so long as the timing apparatus remains in good working order, and feed water remains available in line 66 to "power" it.

As will now be evident, the novel timing apparatus of this invention requires installation effort and skill, and is capable of relatively trouble-free operations for long periods of time. When repairs become necessary, they can be easily effected, and the replacement of parts is relatively inexpensive because of the simplicity of the parts and the consequent ease with which they can be made from commonly available and relatively cheap materials. The calibration of the timing apparatus can be accomplished easily by anyone capable of timing the inflow and outflow of water through valves at different settings. This calibration, incidentally, can be greatly speeded up with the aid of a vertical scale positioned in or adjacent the wall of the timing apparatus tank. It will be apparent that the inflow and outflow valves corresponding to valves 76 and 80 of timing apparatus 10 can be quickly adjusted for desired tank filling and draining periods from experimental determinations of liquid level change times between adjacent scale graduations at differing valve adjustments. Such a scale is shown at 96 on tank 12 in FIG. 2.

The apparatus can be used most effectively where the sequences of ON and OFF cycles of irrigation remain essentially the same for long periods, such as, for example, in areas having long dry seasons with little or no rainfall. Typically illustrative of such areas are those inland valley regions of Southern California where the summers are virtually rainless. The timing apparatus can, however, be employed anywhere irrigation is required, since it is a relatively simple matter to shut down irrigation systems completely during periods of heavy rainfall, or to change the calibration of the timing apparatus to meet differing irrigation needs for differing climactic, and/or other, conditions.

While the novel irrigation timer of this invention has been herein described and illustrated in what is believed to be a preferred embodiment, it will be understood by those skilled in the art that various departures may be made therefrom within the scope of the invention. Certain of these departures have already been mentioned, and others will occur to those skilled in the art in the light of present teachings. More to the point, the scope of the present invention is not fixed by the specifics of the preferred embodiment set forth above but embraces all forms thereof encompassed by the language of the following claims.

What I claim is:

1. Flow control means for quickly and automatically starting and stopping the flow of liquid, in accordance with a sequence of alternating flow and non-flow cycles of respectively equal duration, from a pressurized source through a valve fitted with a control lever adapted to maintain the valve in normally open position but movable in a way to close said valve, and into a conduit in downstream communication with the valve, said flow control means comprising:

a tank having a upper opening and a lower opening for the flow of said liquid into and out of the tank, respectively, said tank being connectable with said conduit in a way to receive a portion of the liquid flowing through said conduit through said upper opening by means including a first adjustable valve, said tank also being adapted to permit the attachment thereto of drainage means, including a second adjustable valve, in communication with said lower opening, whereby some of the liquid can be routed into said tank from said conduit and drained from the tank through said lower opening at desired flow rates, during operation of said flow control means, through appropriate adjustment of the first and second valves;

float means including three separate floats and guide means therefor adapted for installation in said tank so that the floats are confined to fixed paths of travel under the influence of changing liquid levels in the tank, said three separate floats including, in the installed flow control means, a first float, a second float disposed outwardly in one direction from the first float and a third float disposed outwardly in a second direction from said first float;

said float means including, additionally, first pivoted lever means and mounting means therefor adapted for normal disposition in the installed float means in a way to physically restrain said first float when the latter is at substantially its lowest point of travel in the tank and thereby hold the first float at that position, and being pivotally movable by said second float, when the latter arrives at substantially its highest point of travel in the tank, in a way to free the first float from its physical restraint and permit upward movement thereof;

said float means also including second pivoted lever means and mounting means therefor adapted for normal disposition in the installed float means in a way to physically restrain said first float when the latter is at substantially its highest point of travel in the tank and the reby hold the first float in that position, and being pivotally movable by said third float, when the latter descends to substantially its lowest point of travel in the tank, in a way to free the first float from its physical restraint and permit downward movement thereof;

the installed float means including valve actuating means adapted, when upward force is applied thereto, to move said control lever in a way to close said valve;

the valve actuating means and first float being adapted and relatively positioned in the installed float means so that said first float induces said valve actuating means to close said valve under the influence of upwardly exerted force thereon when the first float reaches substantialy its upper limit of travel within said tank;

whereby the operating flow control means serves to automatically effectuate alternating cycles of flow and nonflow of said liquid into said conduit from said pressurized source at fixed flow and nonflow time periods through adjustment of the first and second adjustable valves so that filling time of the tank from a fixed lower level to a fixed upper level, with the second adjustable, or drainage, valve open at its adjusted setting, corresponds to a predetermined time period cycle for flow of the liquid into said conduit, and drainage time of the tank from said fixed upper level to said fixed lower level corresponds to a predetermined time cycle period for nonflow of the liquid into said conduit;

and whereby, when the flow control means is operating, the second and third floats rise with the rising liquid level in said tank during the tank-filling cycle of operations while said first pivoted lever means holds said first float at its lowermost position of travel until said liquid level reaches said fixed upper level, whereat said second float causes the first pivoted lever means to move and free said first float for upward travel, which float then bobs rapidly upwardly through the liquid to its uppermost position of travel and causes the valve actuating means to rapidly close the valve and thereby terminate said tank-filling cycle of operations, after which the second pivoted lever means assumes its normal position and holds said first float at said uppermost position whereat that float maintains said valve closed, by the steady application of upwardly directed force to said valve actuating means, so that the liquid drains from the tank through said adjustable second valve and the second and third float descend with the falling liquid level in the tank until said fixed lower level is reached, whereat the third float forces said second lever means to move and thereby free the first float for descent, which latter then drops rapidly out of contact with said valve actuating means to the cushioning liquid at said fixed lower level and permits the valve actuating means to allow the control lever to move in a way to quickly open said valve and recommence the tank-filling cycle of operations.

2. Flow control means in accordance with claim 1 in which said first pivoted lever means comprises a first pivoted lever designed and mounted for use so that its lower end overrides said first float, when the latter is at substantially its lowermost position in said tank, and its upper end is positioned to be contacted by said second float, when the latter arrives at substantially its highest point of travel in the tank, and thereby moved to cause swinging of said lower end out of the way of said first float and freeing of the latter for said upward movement thereof; and said second pivoted lever means comprises a second pivoted lever designed and mounted for use so that its upper end underlies said first float, when the latter is at substantially its highest point of travel in said tank, and its lower end is positioned to be contacted by said third float, when the latter descends to substantially its lowest point of travel in the tank, and the reby moved to cause swinging of said upper end out from under said first float and freeing of the latter for said downward movement thereof.

3. Flow control means in accordance with claim 2 particularly adaptable for use in controlling alternating on and off periods of water flow in an irrigation system and in which said valve is a master valve for the system and said liquid is water from a suitable pressurized source.

4. Flow control means in accordance with claim 3 in which the guide means for said floats in the installed float means include an upright guide rod for each float, and each float is provided with a hollow passageway adapted to receive an appropriate one of the rods in slidable interfit to thereby permit guided up and down movement of the float within said tank.

5. Flow control means in accordance with claim 4 in which the mounting means for each of the pivoted levers in the installed float means includes an upright member disposed between the guide rod for said first float and that for the other float which said lever is designed to intermittently hold in an extreme position of travel within said tank during operation of the flow control means.

6. Flow control means in accordance with claim 5 which includes a flat top for said tank and in which said valve actuating means comprises a hollow finger member sized to fit telescopically on, and in slidable relationship with, the guide rod for said first float, said flat top having an opening sized to slidably receive said finger member and said finger member being provided with collar means to provide its downward movement completely through said opening, said finger member being sized and positioned for use in said opening so that an upper portion thereof extends above said top and into contact with the outer end of said valve control lever when said outer end is in its lowermost position of use, said lowermost position corresponding to that at which said control lever holds said master valve open, and said finger member serving to move the outer end of said control lever rapidly upwardly when induced to do so by the quick upward rise of said first float upon its release by said first lever during operation of said flow control means, whereupon said valve control lever quickly closes said master valve to commence the drainage cycle of operations of the functioning flow control means.

7. In combination, the flow control means of claim 7, said master valve and its associated control lever, said means including said first adjustable valve and said drainage means including said second adjustable valve.

8. A combination as in claim 7 in further combination with an irrigation system whose flow needs can be satisfied the re by.

9. Flow control means in accordance with claim 6 in which each of said pivoted levers is adapted to be pivotally secured to its supporting upright member so that the lever is heavier from its pivot point to one end than from said pivot point to the other end, the heavier portion of said lever extends generally upwardly in the installed flow control means, and each upright member is provided with adjustable stop means adapted to prevent gravity-induced swinging of its supported lever past a predetemined point corresponding to the optimal normal position of said lever during operation of said flow control means.

10. Flow control means in accordance with claim 9 including graduated scale means associated with said tank adapted to permit the relatively quick determination of approximate tank filling and draining times at different settings of the first and second adjustable valves by timing water level changes between adjacent graduations on said scale at such settings and then making the necessary calculations to arrive at said times.

* * * * *